United States Patent [19]

Wanser

[11] 3,951,678

[45] Apr. 20, 1976

[54] PIGMENTATION OF CRUDE METAL PHTHALOCYANINES

[75] Inventor: Calvin C. Wanser, South Glens Falls, N.Y.

[73] Assignee: Hercules Incorporated, Wilmington, Del.

[22] Filed: Aug. 20, 1974

[21] Appl. No.: 499,094

[52] U.S. Cl. .................. 106/288 Q; 106/308 N; 260/314.5
[51] Int. Cl.² ............................................ C08K 5/34
[58] Field of Search ........ 106/288 Q, 308 N, 308 Q; 260/314.5

[56] References Cited
UNITED STATES PATENTS

| | | | |
|---|---|---|---|
| 2,699,442 | 1/1955 | Eastes et al. | 260/314.5 |
| 3,749,590 | 7/1973 | Thomas et al. | 106/308 N |
| 3,754,958 | 8/1973 | Giamblavo | 106/288 Q |

FOREIGN PATENTS OR APPLICATIONS

| | | | |
|---|---|---|---|
| 972,805 | 10/1964 | United Kingdom | 106/288 Q |

*Primary Examiner*—Winston A. Douglas
*Assistant Examiner*—John P. Sheehan

[57] ABSTRACT

A process for the conversion of crude metal phthalocyanines produced by fusion syntheses into pigments having improved tinctorial strength and transparency is described. The process involves mixing the dry crude metal phthalocyanine with 2 to 5 parts of 82 to 86% sulfuric acid per part of pigment in the crude in the absence of shear to form a paste-like mass and then hydrolyzing the mass under certain conditions using a hot aqueous diluent containing 2 to 15% by weight of pigment in the crude of ammonium hydroxide, tetramethyl ammonium hydroxide or certain amines.

10 Claims, No Drawings

PIGMENTATION OF CRUDE METAL PHTHALOCYANINES

This invention relates to a process for converting crude metal phthalocyanines produced by fusion syntheses into pigments having improved tinctorial strength and transparency.

Metal phthalocyanine pigments are a well-known class of pigments and are conventionally synthesized by heating a phthalonitrile with a metal or a metal salt at 180° to 250°C. or by heating a mixture of a phthalic anhydride, urea and a metal salt or powdered metal at temperatures of the order of 200°C. The syntheses are carried out in the melt without any diluent (fusion synthesis) or with the raw materials in suspension in an inert high boiling solvent such as kerosene, trichlorobenzene, nitrobenzene, etc. (solvent synthesis). The metal phthalocyanine crudes obtained from these syntheses are not utilizable as such and require substantial particle size reduction before acceptable pigmentary properties are attained. Various methods have been proposed and used commercially to reduce the particle size. One well-known method for converting crude (non-pigmentary) metal phthalocyanines into pigments uses acid-pasting or acid-swelling techniques. A method of this type is described in U.S. Pat. No. 2,716,649 to Brouillard (Aug. 30, 1955) and involves milling metal phthalocyanine pigments under conditions of shear with, per part of pigment, 2 to 5 parts of 68 to 100% sulfuric acid and drowning the milled mixture in water. In U.S. Pat. No. 2,840,568 to Brouillard and Mutaffis (June 24, 1958) patentees also teach that further improvement in transparency can be realized by the process of 2,716,649 provided that the milling step is carried out in the additional presence of 0.5 to 5 parts of an inorganic salt such as sodium chloride.

Another method of this type is described in U.S. Pat. No. 3,051,720 to Minnich (Aug. 23, 1962) and involves preconditioning the crude by dry milling under conditions of shear in the absence of milling aids prior to contacting with 2 to 12 parts of 50 to 100% sulfuric acid per part of pigment and then diluting the acid mixture with water. The preconditioning prior to acid contact is said to give pigments of superior tinctorial properties. Pregrinding and grinding the crude in the presence of smaller amounts of sulfuric acid, for example 1 to 1.7 parts of sulfuric acid per part of crude followed by dilution with hot water, is also taught in Czech Pat. No. 143,605 (Nov. 15, 1971).

Yet another method of this type is described in U.S. Pat. No. 3,252,991 to Schmidt and Turetzky (May 24, 1966) and involves mixing a crude metal phthalocyanine with 0.5 to 2.5 parts of at least 80% sulfuric acid per part of pigment for a short period of time sufficient to induce formation of the acid addition compound without attendant crystal growth and forthwith discharging the mixture in water. Pigments produced according to 3,252,991 are said to be comparable or superior in brightness and tinctorial strength to many commercial phthalocyanine pigments and additionally to possess superior ease of dispersion as dry colors.

Now in accordance with this invention it has been found that the tinctorial strength and transparency of pigments derived from crude metal phthalocyanines produced by the fusion synthesis of metal phthalocyanine-forming reactants can be improved to an even greater extent than can be realized by the practice of any of the above prior art techniques by carrying out the acid pasting of the crude in the absence of shear and then hydrolyzing the paste under certain conditions using a hot aqueous diluent containing specified nitrogen-containing compounds. The finding that the strength and transparency of pigments from a crude metal phthalocyanine produced by fusion syntheses are improved by the practice of this invention was indeed surprising since similar improvement is not realized when crude produced by solvent syntheses is treated in the same manner.

Accordingly, the present invention relates to a process for producing a metal phthalocyanine pigment having improved tinctorial strength and transparency comprising (a) intimately contacting a dry crude metal phthalocyanine produced by the fusion synthesis of metal phthalocyanine-forming reactants with, per part of pigment of the crude, about 2 to about 5 parts of about 82 to about 86% sulfuric acid in the absence of shear until a pasty dough-like mass is formed, (b) adding to said mass sufficient of a hot aqueous diluent to provide an aqueous mixture having a sulfuric acid concentration of about 20 to about 50%, or discharging said mass into sufficient of said hot aqueous diluent to provide an aqueous mixture having a sulfuric acid concentration of about 10 to about 15%, said aqueous diluent containing from 2 to 15% by weight of pigment in the crude of at least one compound selected from the group consisting of ammonium hydroxide, tetramethyl ammonium hydroxide and an amine of the formula

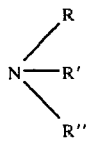

where R is lower alkyl or hydroxy-substituted lower alkyl and R' and R'' are hydrogen or R, and the temperature of said aqueous diluent being between 75° and 100°C., (c) agitating the aqueous mixture at 75° to 100°C. to form a pigment slurry, and (d) recovering the metal phthalocyanine pigment from the slurry.

The process of this invention can be used to pigment any fusion synthesized crude of a metal phthalocyanine as, for example, crudes of copper, nickel, cobalt or zinc, unsubstituted or nuclear substituted phthalocyanines. The invention is particularly useful for crudes of unsubstituted copper phthalocyanine and the halogen-substituted copper phthalocyanines. The crude can be used as fusion synthesized or, if desired, can be comminuted by conventional procedures such as dry hammer milling to break up any large lumps or oversized material and provide a crude of more uniformly sized particles. However, comminution is not necessary for attainment of the advantages of this invention.

As stated, the crude metal phthalocyanine produced by fusion synthesis is intimately contacted in the absence of shear with sulfuric acid having a concentration of about 82 to about 86% in an amount equal to about 2 to about 5 parts of acid per part of pigment in the crude. The time in contact with the acid should be sufficient to wet out the crude and form a paste-like mass. The exact time employed will, of course, vary depending upon such factors as the amount of acid used, method of contact, temperature of the acid, and the particular crude. Usually, the time will vary from about 2 to about 60 minutes and preferably from about 5 to about 30 minutes. Extended contact periods are not necessary and are usually not recommended since in some cases prolonged contact may adversely effect the development of color strength and transparency.

The temperature at contact is not critical and can vary over a considerable range. It is preferred, however, for reasons of economy to operate at a temperature range of from about 20° to about 60°C. and preferably from about 25° to about 50°C.

As stated, contacting is carried out in the absence of forces which are shearing in nature. This aspect is important to the achievement of the advantages of the invention and it has been found that similar results cannot be obtained using such shearing techniques as grinding or milling. Thus, in the process of this invention contact is by mixing or agitation as distinguished from actions which are shearing in nature. Typical mixers which can be employed to achieve intimate contact of the crude and acid without shear include screw flight agitators such as a Nauta mixer, table type mixers, and the like.

If desired, the mixing of the crude and acid can also be carried out in the presence of a water-soluble salt of a mineral acid such as an alkali metal halide, sulfate or phosphate and particularly sodium and potassium chlorides, sulfates, acid sulfates, phosphates, acid phosphates and the like. If present, the salt will usually be added in fine-divided form and in an amount ranging from about 0.5 to about 5 parts per part of pigment in the crude. Generally, it is preferred to preblend the salt with either the crude or acid prior to mixing the crude and acid.

Following contact of the crude and acid to form a paste, the paste is hydrolyzed by dilution with a hot aqueous diluent containing from 2 to 15% by weight of pigment in the crude of certain nitrogen-containing compounds. Dilution can be effected by directly discharging the paste into the hot diluent, in which case the amount of diluent should provide after discharge a final acid concentration of about 10 to about 15%, or, alternatively, the hot diluent can be added directly to the paste, in which case the amount of diluent should provide after the addition a final acid concentration of about 20 to about 50%. Regardless of which procedure is followed, it has been found that the diluent temperature is important to the formation of the improved pigments of this invention and should range from 75° to 100°C. and preferably from about 85° to 100°C. Temperatures below 75°C. have been found to result in poorer color strength and transparency whereas temperatures above 100°C. have not been found to offer further advantages and additionally are not economical since special equipment is required.

The hot aqueous diluent employed in the process of this invention contains, as stated, from 2 to 15% by weight of pigment in the crude of at least one compound which is ammonium hydroxide, tetramethyl ammonium hydroxide or an alkyl amine of the formula

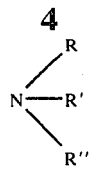

(where R, R' and R'' are as defined above). The exact function of the nitrogen compound is not completely understood but it appears that it acts in some manner to control or hold the pigment particles during hydrolysis. Regardless of what occurs, it has been found that the presence of from 2 to 15% and preferably from about 5 to about 10% by weight of pigment in the crude of at least one of the recited nitrogen compounds in the hot hydrolysis medium is essential to the achievement of outstanding advantages of color strength and transparency of fusion synthesized metal phthalocyanine pigments.

The amines which are useful in the practice of the invention are primary, secondary or tertiary lower alkyl amines or lower alkanolamines and have the formula

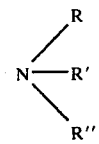

where R is a lower alkyl or a hydroxy-substituted lower alkyl group and R' and R'' are hydrogen or R, it being understood that when R' and/or R'' are alkyl or hydroxy-substituted alkyl, they can be alike or different from each other as well as from R. The preferred alkyl groups contain 1 to 5 carbon atoms and are most preferably ethyl, n-propyl, isopropyl, n-butyl, isobutyl, t-butyl, amyl, isoamyl and t-amyl. Representative amines of the above formula include methylamine, ethylamine, n-propylamine, t-butylamine, amylamine, di-n-butylamine, diisobutylamine, triethylamine, tributylamine, monoethanolamine, diethanolamine, triethanolamine, 2-amino-2-methyl-1-propanol, 2-amino-2-ethyl-1-propanol, 2-amino-1-butanol, 2-amino-2-methyl-1,3-propanediol, 2-amino-2-ethyl-1,3-propanediol, tris(hydroxymethyl) aminomethane, methyl ethanolamine, diethyl ethanolamine, diisopropyl ethanolamine, methyl diethanolamine, and the like.

Following, and preferably during the addition of the hot diluent to the paste, or discharge of the paste into the diluent, the aqueous mixture is agitated to assure intimate contact of the pasted crude and the hydrolysis medium. The agitation time is not critical and usually will vary from about 15 to about 60 minutes to hours or longer. No apparent advantages are realized by prolonged agitation periods and usually times beyond about 60 minutes are unnecessary. Following hydrolysis, the pigment is recovered from the aqueous slurry conventionally, as by filtering or pressing out, washing, drying, and pulverizing.

The metal phthalocyanine pigments produced in accordance with this invention possess outstanding tinctorial strength and transparency and are particularly useful as colorants for printing inks, coating compositions, plastics and the like. Because of their high transparency, they are also important in applications requiring multi-color gloss and/or iridescent effects.

The invention is further illustrated by the following examples. All parts and percentages are by weight unless otherwise indicated.

EXAMPLE 1

A dry granular crude copper phthalocyanine was produced in accordance with U.S. 3,188,318 to Mack (June 8, 1965) by passing a mixture of

| phthalic anhydride | 10.8 parts |
| urea | 20.2 parts |
| cuprous chloride (anhydrous) | 2.2 parts |
| ammonium molybdate (catalyst) | 0.1 part | at a rate of 1.3 lbs. per hour into a reactor of 0.45 cu. ft. total volume and containing 10 lbs. of crude product as a heel. The reactor contents were maintained at 180°C. and the reactor was rotated at 11 r.p.m. The product came out as a dry, granular crude composed of particles less than 0.25 inch in diameter, mostly powder, which analyzed 70% copper phthalocyanine. The crude was comminuted by hammer milling to give a particulate crude passing of 1/32 inch screen.

Ten parts (100% pigment basis) of the comminuted crude prepared above and 10 parts of finely-divided sodium chloride were premixed in a blender for 60 minutes and the blend was added to a cone-shaped tank equipped with a screw flight agitator and containing 39 parts of 84% sulfuric acid maintained at 50°C. Agitation was commenced prior to addition of the blend and continued for an additional 5 minutes, following which time a solution of 0.5 part of triethanolamine in 43 parts of boiling water was rapidly added with agitation to the paste-like mass in the tank, agitation being continued for an additional 10 minutes. The resulting slurry was pressed out, washed with warm water at 50°-60°C., reslurried in water at 50°-60°C., neutralized with ammonium hydroxide, pressed out, washed neutral with water at 50°-60°C., and dried at 70°C. The dried material was hammer milled through a 1/32 inch screen at fast speed, giving red shade alpha copper phthalocyanine pigment.

The pigment of this example, a control pigment A prepared as above except that no triethanolamine was present in the boiling water and a control pigment B prepared as above except that the crude was a solvent synthesized crude analyzing 96% copper phthalocyanine (prepared by reacting the above amounts of phthalic anhydride, urea, cuprous chloride and catalyst in 40 parts of trichlorobenzene at 205°C. with agitation, cooling to 125°C., removing the trichlorobenzene and unreacted materials, drying and comminuting) were evaluated for strength and transparency in quick drying varnish using the following procedure. Blue masstone inks were prepared by mixing 0.5 part of dry pigment color and 0.9 part of quick drying varnish and mulling for 300 revolutions on a Hoover Muller. Tint inks therefrom (made by mixing one part of the masstone ink with 40 parts of quick drying white ink) were drawn down on glass slides and on paper and compared. The tint strength of the ink prepared with the pigment of this example was slightly stronger and the color was more transparent than that of the ink prepared with the control pigment A. The tint strength of the ink from the pigment of this example was much stronger and the color was much more transparent than the ink from control pigment B.

EXAMPLE 2

Ten parts of the comminuted crude copper phthalocyanine of Example 1 were introduced into a cone-shaped mixer tank containing an agitated mixture of 39 parts of 84% sulfuric acid and 10 parts of finely-divided sodium chloride at 50°C. Agitation was continued for 5 minutes, following which time a solution of 1.7 parts of 28.6% ammonium hydroxide in 46 parts of boiling water was rapidly added with agitation to the paste-like mass in the tank. Agitation was continued for 10 minutes and the pigment was recovered as in Example 1. The pigment of this example was comparable in tint strength and transparency to the pigment of Example 1.

EXAMPLE 3

The procedure of Example 1 was repeated except that the temperature of the sulfuric acid was maintained at 25°C. The pigment of this example was comparable in tint, but slightly less transparent than the pigment of Example 1.

EXAMPLE 4

The procedure of Example 1 was followed except that the sodium chloride was omitted and the crude was added directly to the cone-shaped tank containing the sulfuric acid. The pigment of this example was slightly weaker in tint and slightly less transparent than the pigment of Example 1.

EXAMPLE 5

Ten parts of the comminuted crude of Example 1 were added gradually with agitation to a vessel containing 39 parts of 84% sulfuric acid, at room temperature and the mixture agitated for 5 minutes. The resulting doughy mass was dropped with a spatula into 200 parts of boiling water containing 0.5 part of triethanolamine under agitation and agitation was continued for 10 minutes, following which the pigment was recovered as in Example 1. The pigment of this example was comparable in tint strength and transparency to the pigment of Example 1.

EXAMPLES 6 to 9

The procedure of Example 1 was repeated except that an equal amount of tetramethyl ammonium hydroxide, 2-amino2-methyl-1-propanol, diethanolamine or n-amylamine was substituted for triethanolamine. Each of the pigments of these examples was comparable in tint strength and transparency to the pigment of Example 1.

EXAMPLE 10

The procedure of Example 1 was repeated except that the crude contained 4% chlorine and was prepared by blending 7 parts of the crude of Example 1 with 3 parts of a chlorinated crude prepared according to the procedure of Example 1 except that gaseous chlorine was passed through the dry copper phthalocyanine at 160°-200°C., the chlorinated crude containing by analysis 13% chlorine. The pigment of this example was stronger and more transparent than a control pigment prepared in the same manner except that no triethanolamine was present.

What I claim and desire to protect by Letters Patent is:

1. A process for producing a metal phthalocyanine pigment having improved tinctorial strength and transparency comprising:
   a. intimately contacting a dry crude metal phthalocyanine produced by the fusion synthesis of metal phthalocyanine-forming reactants with per part of pigment in the crude, about 2 to about 5 parts of about 82 to about 86% sulfuric acid in the absence of shear until a pasty dough-like mass is formed,
   b. adding to said mass sufficient of a hot aqueous diluent to provide an aqueous mixture having a sulfuric acid concentration of about 20 to about 50%, or discharging said mass into sufficient of said hot aqueous diluent to provide an aqueous mixture having a sulfuric acid concentration of about 10 to about 15%, said aqueous diluent consisting essentially of water and from 2 to 15% by weight of pigment in the crude of at least one compound selected from the group consisting of ammonium hydroxide, tetramethyl ammonium hydroxide and an amine of the formula

where R is lower alkyl of hydroxy substituted lower alkyl and R' and R'' are hydrogen or R, and the temperature of said aqueous diluent being between 75° and 100°C,
   c. agitating the aqueous mixture of 75° to 100°C. to form a pigment slurry, and
   d. recovering the metal phthalocyanine pigment from the slurry.

2. The process of claim 1 wherein the crude is unsubstituted copper phthalocyanine.

3. The process of claim 2 wherein the contacting is carried out in the presence of about 0.5 to about 5 parts of a finely-divided salt of a mineral acid based on each part of pigment in the crude.

4. The process of claim 3 wherein said compound is triethanolamine.

5. The process of claim 3 wherein said compound is ammonium hydroxide.

6. The process of claim 3 wherein said compound is tetramethyl ammonium hydroxide.

7. The process of claim 3 wherein said compound is triethylamine.

8. The process of claim 3 wherein said compound is n-amylamine.

9. The process of claim 3 wherein said compound is 2-amine-2-methyl-1-propanol.

10. The process of claim 1 wherein the crude is chlorine substituted copper phthalocyanine.

* * * * *